United States Patent
Fuller et al.

(10) Patent No.: US 9,207,928 B2
(45) Date of Patent: Dec. 8, 2015

(54) COMPUTER-READABLE MEDIUM, APPARATUS, AND METHODS OF AUTOMATIC CAPABILITY INSTALLATION

(75) Inventors: Robin Fuller, Georgetown, TX (US); Joe Senner, Georgetown, TX (US); Timothy Wall, Georgetown, TX (US)

(73) Assignee: Bladelogic, Inc., Houston, TX (US)

( * ) Notice: Subject to any disclaimer, the term of this patent is extended or adjusted under 35 U.S.C. 154(b) by 611 days.

(21) Appl. No.: 13/007,992

(22) Filed: Jan. 17, 2011

(65) Prior Publication Data

US 2012/0185840 A1   Jul. 19, 2012

(51) Int. Cl.
G06F 9/445   (2006.01)

(52) U.S. Cl.
CPC .......................................... *G06F 8/65* (2013.01)

(58) Field of Classification Search
None
See application file for complete search history.

(56) References Cited

U.S. PATENT DOCUMENTS

| | | | |
|---|---|---|---|
| 5,432,932 A * | 7/1995 | Chen et al. ..................... | 718/103 |
| 5,892,903 A | 4/1999 | Klaus | |
| 6,100,885 A | 8/2000 | Donnelly et al. | |
| 6,108,715 A | 8/2000 | Leach et al. | |
| 6,151,643 A * | 11/2000 | Cheng et al. ..................... | 710/36 |
| 6,178,551 B1 | 1/2001 | Sana et al. | |
| 6,253,257 B1 * | 6/2001 | Dundon ......................... | 719/331 |
| 6,263,377 B1 | 7/2001 | Monday et al. | |
| 6,349,408 B1 | 2/2002 | Smith | |
| 6,353,926 B1 * | 3/2002 | Parthesarathy et al. ....... | 717/170 |
| 6,381,742 B2 * | 4/2002 | Forbes et al. ................ | 717/176 |
| 6,384,923 B1 * | 5/2002 | Lahey ........................... | 358/1.13 |
| 6,418,554 B1 * | 7/2002 | Delo et al. ..................... | 717/174 |
| 6,434,744 B1 * | 8/2002 | Chamberlain et al. ........ | 717/168 |
| 6,457,076 B1 * | 9/2002 | Cheng et al. ..................... | 710/36 |
| 6,490,722 B1 * | 12/2002 | Barton et al. .................. | 717/174 |
| 6,490,723 B1 * | 12/2002 | Bearden et al. ............... | 717/174 |
| 6,523,166 B1 * | 2/2003 | Mishra et al. .................. | 717/174 |
| 6,601,095 B1 | 7/2003 | Duffield et al. | |
| 6,718,373 B1 * | 4/2004 | Bearden et al. ............... | 709/220 |
| 6,996,818 B2 * | 2/2006 | Jacobi et al. ................... | 717/170 |
| 7,069,339 B2 | 6/2006 | Champlin | |
| 7,277,937 B2 | 10/2007 | Caceres et al. | |
| 7,293,117 B2 | 11/2007 | Ohta | |
| 7,346,766 B2 | 3/2008 | Mackin et al. | |
| 7,356,816 B2 | 4/2008 | Goodman et al. | |
| 7,370,095 B2 | 5/2008 | Sauvage et al. | |
| 7,484,084 B1 | 1/2009 | Ranaweera et al. | |

(Continued)

OTHER PUBLICATIONS

"How does Windows Installer work?", PC Performance Clinic, 2009, <http://www.pcperformanceclinic.com/performance/how-windows-installer-work.php>, pp. 1-3.*

(Continued)

*Primary Examiner* — Thuy Dao
*Assistant Examiner* — Samuel Hayim

(57) ABSTRACT

A computer-readable medium includes instructions that, when executed by a processor, cause the processor to receive an installation request from a remote device through a communication channel to update a software component associated with the processor. The processor identifies a capability library component that will be used to perform at least a portion of the installation request and retrieves and uses the capability library component from a local data store to perform the portion of the installation request if the local data store includes the capability library component. The processor requests the capability library component from the remote device if the local data store does not include the capability library component.

19 Claims, 5 Drawing Sheets

(56) References Cited

U.S. PATENT DOCUMENTS

| | | | |
|---|---|---|---|
| 7,496,739 | B1 | 2/2009 | Raghavan et al. |
| 7,634,488 | B2* | 12/2009 | Keys et al. .............................. 1/1 |
| 7,673,023 | B1* | 3/2010 | Nelson et al. ................. 709/221 |
| 7,676,556 | B2 | 3/2010 | Goldstein |
| 7,797,527 | B2 | 9/2010 | Duncan |
| 7,802,083 | B2 | 9/2010 | Gurumoorthy et al. |
| 7,809,936 | B2 | 10/2010 | Einloth et al. |
| 2001/0029605 | A1* | 10/2001 | Forbes et al. .................... 717/11 |
| 2001/0029607 | A1* | 10/2001 | Veres et al. ..................... 717/11 |
| 2002/0002704 | A1* | 1/2002 | Davis et al. ..................... 717/11 |
| 2002/0062287 | A1* | 5/2002 | Katz et al. ....................... 705/51 |
| 2002/0099726 | A1* | 7/2002 | Crudele et al. ................. 707/200 |
| 2002/0157089 | A1* | 10/2002 | Patel et al. .................... 717/178 |
| 2002/0174422 | A1* | 11/2002 | Kelley et al. .................. 717/178 |
| 2002/0194584 | A1* | 12/2002 | Suorsa et al. .................. 717/176 |
| 2003/0145317 | A1* | 7/2003 | Chamberlain ................ 717/177 |
| 2003/0182652 | A1* | 9/2003 | Custodio ....................... 717/122 |
| 2004/0083474 | A1* | 4/2004 | McKinlay et al. ............. 717/176 |
| 2004/0128669 | A1* | 7/2004 | Furst et al. .................... 717/178 |
| 2004/0143830 | A1* | 7/2004 | Gupton et al. ................. 717/174 |
| 2004/0226010 | A1* | 11/2004 | Suorsa ........................... 717/174 |
| 2004/0255291 | A1* | 12/2004 | Sierer et al. ................... 717/174 |
| 2005/0257209 | A1* | 11/2005 | Adams et al. ................. 717/168 |
| 2007/0130255 | A1 | 6/2007 | Wolovitz et al. |
| 2007/0234331 | A1* | 10/2007 | Schow et al. ................. 717/168 |
| 2007/0294684 | A1* | 12/2007 | Kumashiro et al. ........... 717/168 |
| 2007/0294686 | A1* | 12/2007 | Oh ................................. 717/168 |
| 2008/0114860 | A1* | 5/2008 | Keys et al. .................... 709/219 |
| 2008/0263511 | A1* | 10/2008 | Shapiro ......................... 717/104 |
| 2009/0013162 | A1 | 1/2009 | Nandan et al. |
| 2009/0187752 | A1 | 7/2009 | Hirai |

OTHER PUBLICATIONS

Greg Bruno et al., "Rolls: Modifying a Standard System Installer to Support User-Customizable Cluster Frontend Appliances", IEEE, 2004, <http://ieeexplore.ieee.org/stamp/stamp.jsp?tp=&arnumber=1392641>, pp. 1-10.*

Andrew Harrison et al., "Web Enabling Desktop Workflow Applications", ACM, 2009, <http://delivery.acm.org/10.1145/1650000/1645169/a5-harrison.pdf>, pp. 1-9.*

Product Release: go TM Agile Release Management, ThoughtWorks, Inc., downloaded from www.thoughtworks-studios.com on Dec. 31, 2010, 13 pages.

Partington, Vincent, "Whitepaper: Java Deployments in an Enterprise Environment," XebiaLabs, Jul. 2010, 17 pages.

ControlTier Overview and Architecture, downloaded from http://doc36.controltier.org/wiki/ControlTier on Dec. 31, 2010, 16 pages.

* cited by examiner

COMPUTER-READABLE MEDIUM, APPARATUS, AND METHODS OF AUTOMATIC CAPABILITY INSTALLATION

FIELD

The present disclosure is generally related to computer network systems. More particularly, the present disclosure relates to systems and methods for installation of instructions and/or configuration data to install new capability library components on a networked computing system.

BACKGROUND

Management of multi-computer environments, such as enterprise environments that might include computing systems associated with different stages of product development (e.g., development, quality assurance, and production), different locations, different roles within the enterprise, etc., can be challenging to administer. In addition to such difficulties, information security systems can impede remote administration. To overcome such difficulties in distributed computing environments, deployment of software upgrades, patches, and new installations often require development of custom scripts or specialized hardware. As used herein, the term "distributed computing environment" refers to computing systems configured to communicate with other computing systems through one or more network connections to perform a particular operation, which may provide a service to an end user. Further as used herein, the term "networked computing system" refers to one or more devices configured to send and receive data through a network connection.

One example of a specialized hardware solution is represented by a standard called Intelligent Platform Management Interface (IPMI) Specification, Second Generation," v. 2.0, Feb. 12, 2004 (hereinafter the "IPMI Standard"), which involves a Baseboard Management Controller (BMC) included in each server-class computer. The BMC is a specialized microcontroller embedded on the motherboard of each of the server class computing systems to be supported and is configured to manage the interface between the system management software and the platform hardware. The BMC provides a means for updating firmware on a host computing system, where the BMC of the host computing system communicates with a remote management application to update the BIOS firmware of the host computing system. In the IPMI Standard, a serial port of the host computing system is remapped so that all outgoing communications directed to that serial port are routed over the server's local area network interface, allowing the BMC to communicate with the remote management application via the local area network.

SUMMARY

In an embodiment, a computer-readable medium includes instructions that, when executed by a processor, cause a processor to receive an installation request from a remote device through a communication channel to update a software component associated with the processor. The processor identifies a capability library component that will be used to perform at least a portion of the installation request and retrieves and uses the capability library component from a local data store to perform the portion of the installation request if the local data store includes the capability library component. The processor requests the capability library component from the remote device if the local data store does not include the capability library component.

In another embodiment, a method includes receiving an installation request at a computing system from a remote device through a communication channel and automatically identifying a capability library component that will be used to perform at least a portion of the installation request. The method further includes sending data indicating a version of the capability library component to the remote device if the capability library component is in a local data store, receiving a signal from the remote device, and selectively processing the installation request in response to the signal.

In still another embodiment, an apparatus includes an interface adapted to couple to a network, a processing system coupled to the interface, and a memory coupled to the processing system and configured to store a plurality of capability library components and at least one of an application and a set of instructions for providing a service. The memory embodies instructions that, when executed by the processor, cause the processor to receive an installation request to install at least one of a second application from a remote device via the interface, a second set of instructions, an updated version of the second application, and an updated version of the set of instructions. The processor determines a capability library component for processing the installation request, retrieves the capability library component from one of the remote devices and the plurality of capability library components, and processes the installation request using the capability library component.

BRIEF DESCRIPTION OF THE DRAWINGS

In the following description, the use of the same reference numerals in different drawings indicates similar or identical items.

DETAILED DESCRIPTION OF ILLUSTRATIVE EMBODIMENTS

Figure 1:
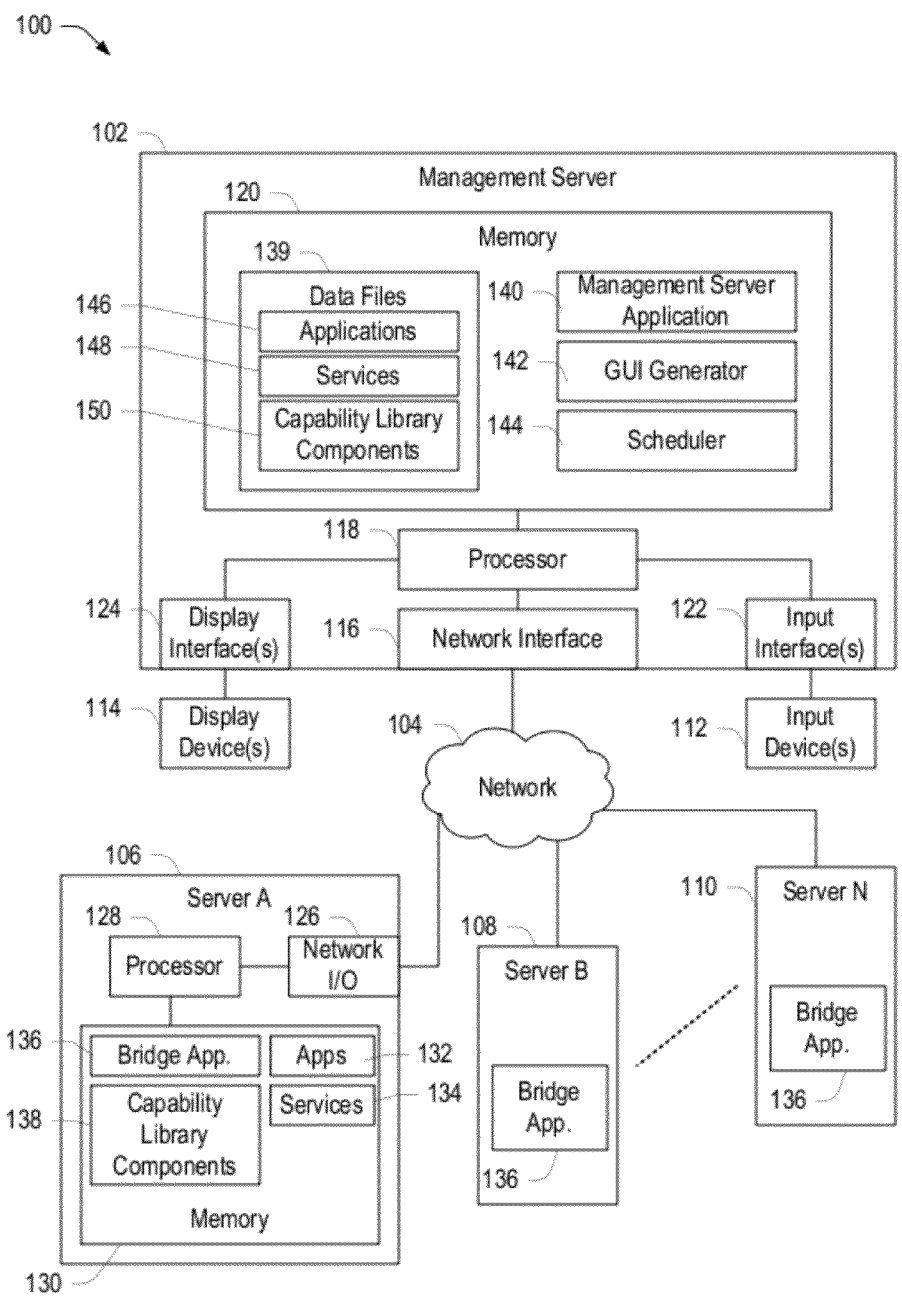
FIG. 1 is block diagram of an embodiment of a system including a management server and a plurality of servers, each of which includes a bridge application configured to provide automatic capability installation.

In the following discussion of the illustrated embodiments, various elements are depicted and described as being connected to one another. However, it should be understood that the various embodiments may include components (not shown) through which such connections are made. Accordingly, in the following discussion, the terms "connected" and "coupled" include, but are broader than, direct connection. Further, as used herein, the term "computing device" or "computing system" refers to any device that is capable of communicating with a network and that includes a memory that retains stored data even when power is removed (i.e., a non-volatile memory), such as a hard disk drive or flash memory, and a processor capable of executing processorreadable instructions. Examples of a computing device include a laptop computer, a desktop computer, a server computer, a media player, a smart phone, or another processing device.

Computer-readable media, methods, and computing systems are disclosed that are configured for automatic capability installation. In an example, a computing system includes a bridge application, executable by a processor of the computing system, to retrieve capability library components from a management server, as needed, to perform installations or updates of applications or services on the computing system. The bridge application listens for an installation request from the management server. The installation request can include instructions to install a new service or a new application, to update an existing service or an existing application, or to roll back an installation and reinstall. In response to receiving the installation request, the bridge application determines the capabilities of the computing system relative to at least a portion of the install instructions. If the computing system has a capability library component to be used for the installation stored in a local data store (such as a non-volatile memory within or directly attached to the computing system), the bridge application communicates version information associated with the library component to the management server. If the version information is a desired version, the bridge application receives an acknowledgement from the management server and, in response to the acknowledgement, uses the capability library component to install the portion of the instructions.

If the version information is not a desired version, the bridge application receives an updated capability library component from the management server, installs the updated capability library component, and uses it to install at least a portion of the installation request. If the bridge application cannot find the capability library component in the local data store, the bridge application communicates the absence of the capability library component to the management server and, in response to communicating the absence, receives the capability library component from the management server. The bridge application stores the capability library component in the local data store and uses it to perform at least a portion of the installation request.

FIG. 1 is block diagram of an embodiment of a networked computing system 100 including a management server 102 and a plurality of servers 106, 108 and 110, each of which includes a bridge application 136 configured to provide automatic capability installation. Management server 102 is connected to the plurality of servers 106, 108, and 110 through a network 104, such as the Internet, a local area network, or a combination thereof. Management server 102 and servers 106, 108, and 110 are computing systems, each of which includes a processor and a memory. Management server 102 connects to one or more input devices 112 through a corresponding one or more input interfaces 122 and to one or more display devices 114 through a corresponding one or more display interfaces 124. Management server 102 includes a network interface 116 connected to network 104 and to a processor 118, which is connected to the one or more display interfaces 124 and to the one or more input interfaces 122. Management server 102 includes memory 120 connected to processor 118.

Memory 120 includes data files 139, management server application 140 for managing communication of installation instructions and capability library components to remote devices, such as servers 106, 108, and 110, a graphical user interface (GUI) generator 142 for generating a user interface with which an operator may interact using the one or more input devices 112, and a scheduler 144 configurable by the operator to schedule communications. Data files 139 include one or more applications 146 (stand-alone, independent programs), one or more sets of instructions to implement services 148, and capability library components 150. Capability library components 150 include processor-executable code and data that provide services to independent programs, allowing for sharing and changing of code and data in a modular fashion. In networked computing system 100, capability library components 150 are not executable as stand-alone applications, but rather function in conjunction with bridge application 136 to perform at least a portion of an installation request.

Server 106 includes a network input/output (I/O) interface 126 connected to network 104 and to a processor 128, which is connected to a memory 130. Memory 130 is a local data store that is configured to store one or more applications 132, one or more services 134, bridge application 136, and capability library component 138. Each of the servers 106, 108, and 110 includes a network I/O, a processor, and a memory connected to the processor.

In operation, processor 128 executes bridge application 136 to listen for an installation request from management server application 140. In response to receiving an installation request, bridge application 136 locates a corresponding capability library component within capability library components 138 in the local data store, loads the capability library component, and uses the capability library component to perform at least a portion of the installation request. If bridge application 136 cannot locate the corresponding capability library component in the memory 130 (local data store), bridge application 136 requests the capability library component from management server 102, receives the capability library component from management server 102, stores it in memory 130, loads it, and uses it to perform at least a portion of the installation request.

In an embodiment, bridge application 136 communicates version information associated with the corresponding capability library component to management server 102 to verify that the corresponding capability library component is the one that should be used to perform the portion of the installation request. If a newer capability library component exists, management server 102 provides the newer capability library component to bridge application 136, which stores it in memory 130, loads it, and uses it to perform the portion of the installation request. Otherwise, management server 102 acknowledges that the capability library component 138 should be used, and bridge application 136 uses it to perform the portion of the installation request.

In a particular example, management server 102 may be used by an operator to schedule at least one of an installation operation, an upgrade operation, a modification operation, and a removal operation associated with one of an application, a service, or a configuration. In particular, processor 118 executes GUI generator 142 to provide a user interface to display device 114, and an operator interacts with the user interface via one or more input devices 112 to define and/or schedule a request. The operator can define a request in a variety of ways, such as by uploading an installation/upgrade script, uploading a new capability library, uploading a new service or application, entering free-form text, and so on. The user interface provides text input, browse capabilities, and/or a script wizard for defining the request. Further, the user interface allows the operator to create a logical association of disparate platforms, grouping computing systems into environments that relate, for example, to release phases of an application, and ordering the environments to implement an application release plan. The operator can interact with scheduler 144 to schedule transmission of the request. For example, the operator can schedule transmission of the request to multiple servers substantially concurrently at a particular date and time. In another example, the operator can schedule transmission of the request in a staged rollout based on the server location, the server's role, and so on. Once defined and/or scheduled, management server 102 sends a request (according to the schedule if the operator defined a schedule) to one or more of the servers 106, 108, and 110 through network 104, triggering the bridge application 136 at one or more of the servers 106, 108, and 110 to operate as described above to perform at least a portion of the request.

While the above-discussion has focused on a server implementation, bridge application 136 may be deployed in a variety of computing systems, including stand-alone workstations, laptop computer, cell phones, and other computing systems. Regardless of the type of computing system within which bridge application 136 is installed, bridge application 136 establishes a communication channel through the network 104 to management server 102 to listen for and receive requests and to request capability library components as needed to perform the requests. Bridge application 136 is further described below with respect to FIG. 2.

Figure 2:
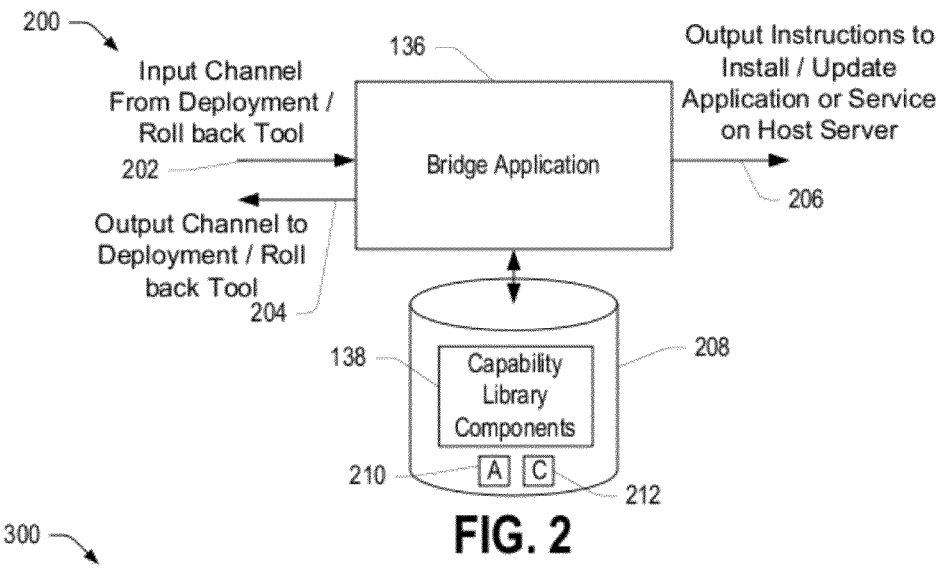
FIG. 2 is a block diagram of an embodiment of a system including the bridge application of FIG. 1.

FIG. 2 is a block diagram of an embodiment of a system 200 including the bridge application 136 of FIG. 1. Bridge application 136 includes an input connected to an input channel 202, an output connected to an output channel 204, and an output 206 configured to communicate with hardware and/or firmware of a host computing system, such as that of server 106 in FIG. 1. Bridge application 136 may utilize secure socket layer (SSL) protocols to negotiate a secure bi-directional communication channel including input channel 202 and output channel 204. System 200 further includes a local data store 208 for storing capability library components 138 including capability library component A 210 and capability library component C 212. Capability library component A 210 and capability library component C 212 include code and data that provide services to independent programs that may be executed by the host system, for example, in conjunction with bridge application 136, and that are not themselves executable as stand-alone instructions. In one example, capability library component A 210 specifies a memory location where a specific library is stored, making it possible for bridge application 136 to install an updated version of the library upon a request from management server 102.

Figure 3:
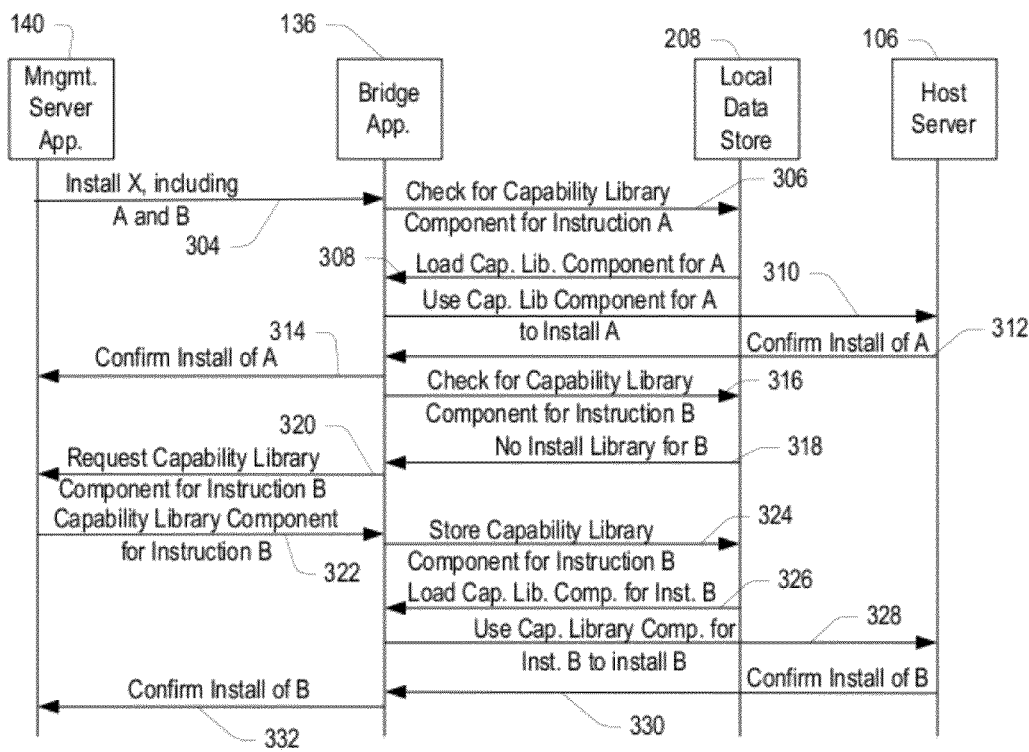
FIG. 3 is a ladder diagram of an example of a process of automatic capability installation using the system of FIGS. 1 and 2.

FIG. 3 is a ladder diagram 300 of an example of a process of automatic capability installation using the system of FIGS. 1 and 2. Ladder diagram 300 includes management server application 140, bridge application 136, local data store 208, and server 106, which is the host server for bridge application 136. Management server application 140 operates at management server 102 and communicates with bridge application 136 at a server, such as server 106, through a communication channel including, for example, input channel 202 and output channel 204 depicted in FIG. 2. At 304, management server application 140 transmits a request to install X, including instructions A and instructions B to bridge application 136. Bridge application 136 checks for a capability library component for installation of A in local data store 208 (i.e., component A 210 in FIG. 2) at 306. At 308, bridge application 136 loads the capability library component for installation of A. Bridge application 136 uses the capability library component to install A on host server 106 at 310, and host server 106 confirms installation at 312. At 314, bridge application 136 confirms the installation of A to management server application 140.

At 316, bridge application 136 checks for a capability library component for installation of component B in local data store 208. At 318, bridge application 136 finds no capability library for installation of component B in local data store 208, and requests a capability library component for installation of component B from management server application 140 at 320. Management server application 140 retrieves the capability component library from capability library components 150 within data files 139 and sends the capability component library for installation of component B to bridge application 136 at 322. Bridge application 136 stores the capability library component in local data store 208 at 324, loads the capability library component from local data store 208 at 326, and uses the capability library component for installation of component B on host server 106 at 328. At 330, server 106 confirms installation of component B to bridge application 136, which sends a confirmation of installation of component B to management server application 140 at 332.

In an alternative embodiment, after bridge application 136 loads capability library component for installation of A 210 at 308 and prior to using capability library component to install component A at 310, bridge application 136 communicates version information related to the loaded capability library component for installation of A 210 to management server application 140. Management server application 140 determines if there is a newer version of the capability library component for installation of A 210. If so, then management server application 140 retrieves the newer version from capability library components 150 within data files 139 and sends the newer version to bridge application 136, which stores the newer version in local data store 208, then loads the newer version and uses it to install component A on host server 106.

Thus, bridge application 136 serves to manage version updates and to install new applications, new services, and so on. In a multiple-server environment, an administrator can deploy new services or applications, update existing services or applications, and manage upgrades on already deployed servers from a user interface provided by management server 102. Further, an administrator can use management server 102 to schedule a rollout or a roll back of a particular application or service to multiple computing systems in a scheduled deployment and/or across multiple systems substantially concurrently. In an example, a roll back operation may change a state of one or more computing systems from a current state to a previous state, such as prior to installation of a patch, upgrade, application, or service. In some instances, the roll back operation includes un-installing a particular installation and re-installing a prior installation to restore the one or more computing systems to a prior "known good" state, for example.

Unlike application delivery tools that deploy applications for one person or for a small group of similarly tasked people, management server application 140 and bridge application 136 cooperate to facilitate enterprise application delivery with sufficient flexibility to manage a variety of deployment needs, from traditional office information technology installation services to developer/test server/alpha/beta/deployment release installation plans. In general, bridge application 136 and management server application 140 cooperate to simplify the update/install process, allowing administrators and operators to work on core information service functions while facilitating updates, upgrades, and new installations without requiring the administrator to focus his/her energy on every facet of the installation process. In particular, management server application 140 provides a platform for coordinated introduction of software and configurations across platforms, applications, and services.

In the context of a software development build model, a set of sources are combined and processed into a target binary file. However, the traditional model uses manual tracking and processes for determining whether the same build model is followed after the target binary file is provided to quality assurance. The development build model creates a representation of a set of sources (binaries, configurations, schemas, etc.) from a specific point in time processed into a singular binary file. Systems that pull components of an asset every time a delivery occurs cannot ensure that the asset doesn't change as it moves through promotion states (from development to production). Rather, such pull-systems create entities that represent different points in time, violating the basic principle of a software release version model. In contrast, management server application 140 can operate in conjunction with bridge application 136 to control versioning of the binary file to ensure a consistent build throughout the development-to-production cycle. An example of a system configured to manage deployment of an application or service across multiple logical entities within an enterprise is described below with respect to FIG. 4.

Figure 4:
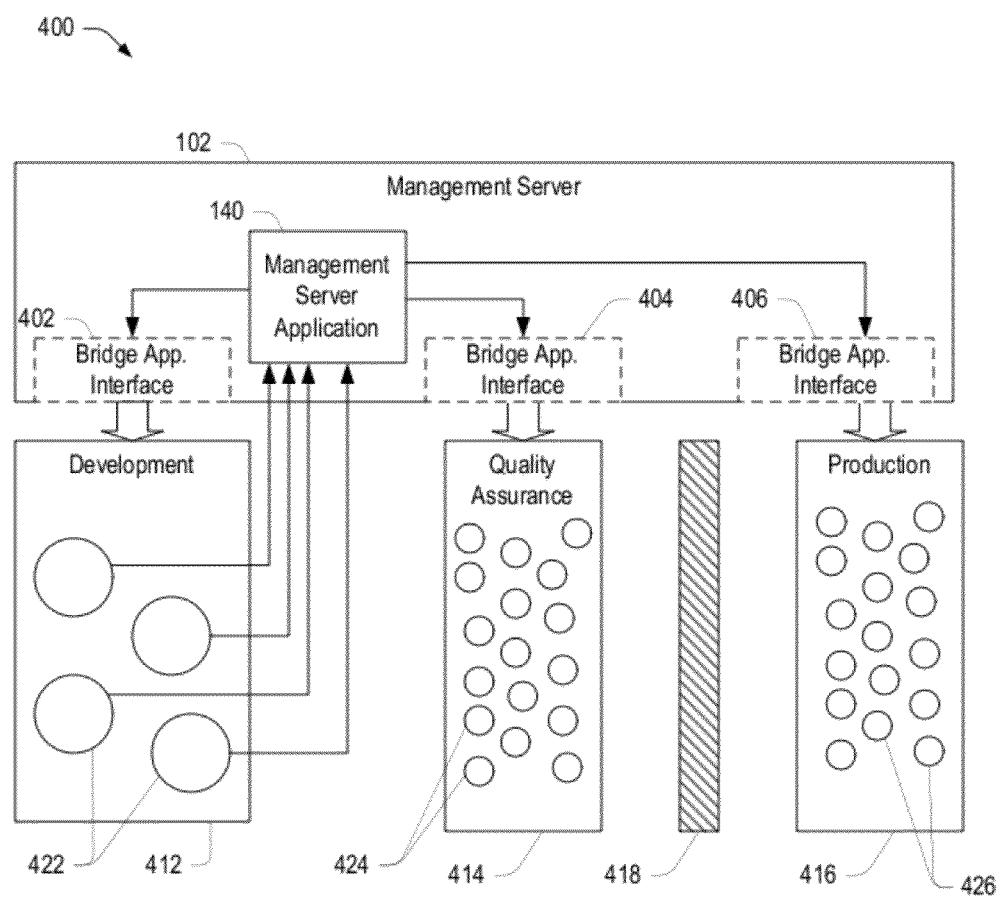
FIG. 4 is a block diagram of an embodiment of a system including the management server of FIG. 1 in a representative enterprise environment.

FIG. 4 is a block diagram of an embodiment of a system 400 including the management server 102 of FIG. 1 in a representative enterprise environment. System 400 includes management server 102 having management server application 140 executing on processor 118 (shown in FIG. 1) and including a bridge application interface 402 to a development environment 412, a bridge application interface 404 to a quality service environment 414, and a bridge application interface 406 to a production (release) environment 416. Quality assurance environment 414 may be separated from production environment 416 by a firewall 418.

Development environment 412, quality assurance environment 414, and production environment 416 represent logical association of disparate platforms, grouping computing systems into environments that relate, for example, to release phases of an application. Management server 102 allows an operator to logically order the environments to implement a particular application release plan. For example, development environment includes multiple computing systems 422, each of which includes a bridge application 136 (shown in FIGS. 1-3) and each of which may contribute to a state of an application in the development environment 412. Quality assurance environment 414 includes multiple computing systems 424, each of which includes a bridge application 136 and each of which may contribute to quality assurance verification of the application. Production environment 416 includes multiple computing systems 426, each of which includes a bridge application 136 and each of which may contribute to the sale or deployment of the application, for example, to an end user device.

Management server 102 provides a common access and control point for managing application delivery, such as application quality testing and verification and web application delivery, across an enterprise. Management server 102 controls delivery and distribution of capability library components across the logical environments.

Figure 5:
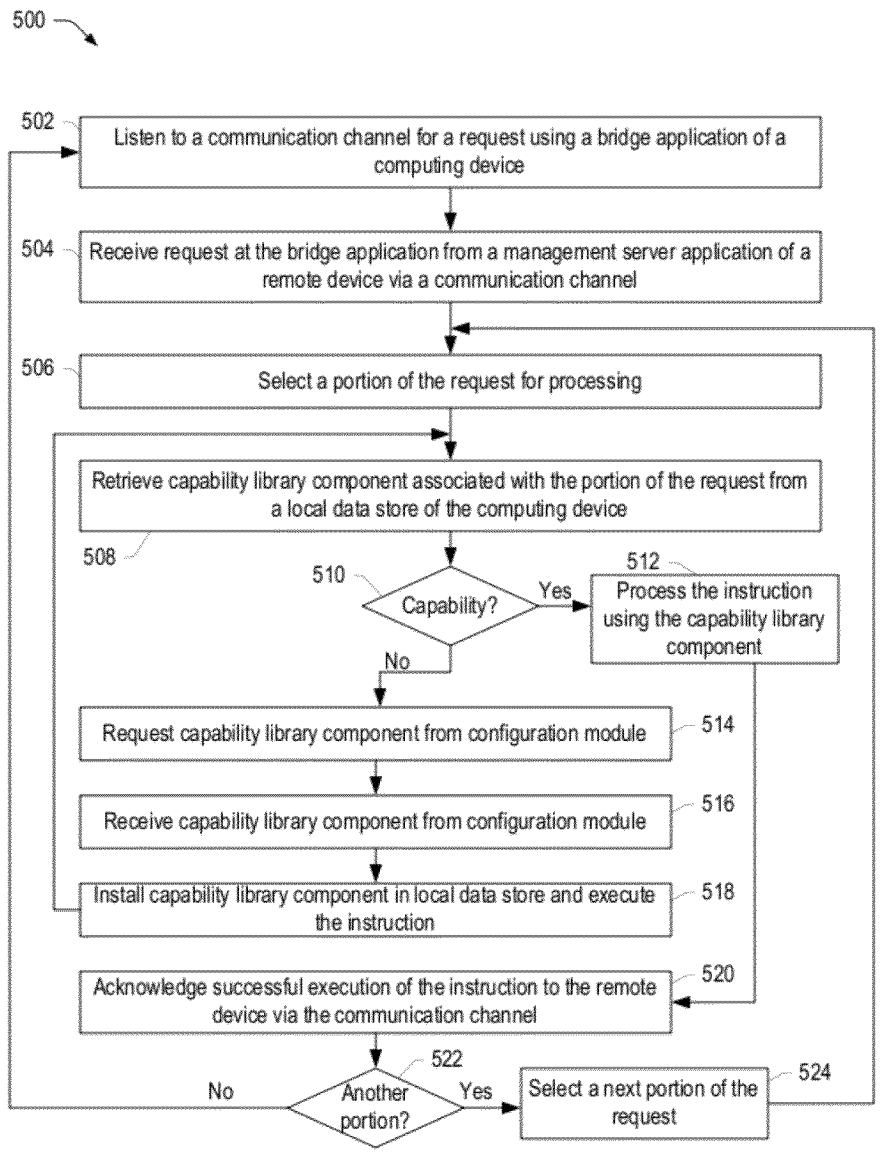
FIG. 5 is a flow diagram of an embodiment of a method of automatic capability installation.

FIG. 5 is a flow diagram of an embodiment of a method 500 of automatic capability installation. At 502, bridge application 136 of a computing system listens to an input channel 202 for a request. Advancing to 504, bridge application 136 receives the request from a management server application of a remote device via the input channel 202. Continuing to 506, bridge application 136 selects a portion of the request for processing. Moving to 508, bridge application retrieves a capability library component associated with the portion of the request from a local data store 208 of the server 106. At 510, if the capability library component is not available through the local data store 208, the method 500 advances to 514 and the bridge application 136 requests the capability library component from the management server application 140 of the remote device. Continuing to 516, the bridge application 136 receives the capability library component from management server application 140. Proceeding to 518, bridge application 136 stores the capability library component in local data store 208, and the method 500 returns to 508.

At 508, bridge application 136 retrieves the capability library component associated with the portion of the request from local data store 208. At 510, if the capability library component is available through the local data store 208, the method 500 proceeds to 512 and bridge application 136 uses the capability library component to process the instruction 512. Advancing to 520, bridge application 136 acknowledges successful execution of the instruction to the remote device via the communication channel. Moving to 522, if the request included another portion, the method returns to 506 and next portion of the request is selected for processing. Otherwise, the method 500 returns to 502 and bridge application 136 listens to the communication channel for another request.

Method 500 represents one example out of many possible examples of a method of automatic capability installation. The order and arrangement of method 500 may vary and some blocks may be omitted. For example, in an alternative embodiment, bridge application 136 may be configured to process the request in its entirety rather than in portions, such that block 506 may be omitted.

While the above method 500 did not describe a version-verification process, it should be appreciated that, upon retrieval of the capability library component, bridge application may communicate version information to the remote device. After communicating the version information, bridge application 136 may wait for a response from the remote device. The response from the remote device includes an acknowledgment that the version is a correct version or a newer version of the capability component library. If the response indicates that the bridge application 136 has loaded the correct version, bridge application 136 uses the capability library component to process the request. Otherwise, if the response provides a newer version, bridge application 136 installs the newer version in local data store 208, then loads the newer version and uses it to process the request.

Additionally, if a capability library component is unavailable or if the computing system fails to process the request using the capability library component, bridge application is configured to provide an alert to management server application 140, which alert can be used by an operator to troubleshoot the request execution. In an example involving a staged rollout, one group of logically related computing systems could be scheduled to receive the request at a first time and another group could be scheduled to receive the request a second time. In this staged rollout, errors associated with the request at the first group can be addressed by an operator to overcome the difficulties, and the correction can be applied to the rollout at the second time, such that errors and/or problems associated with processing of the request can be eliminated over time, prior to production.

Figure 6:
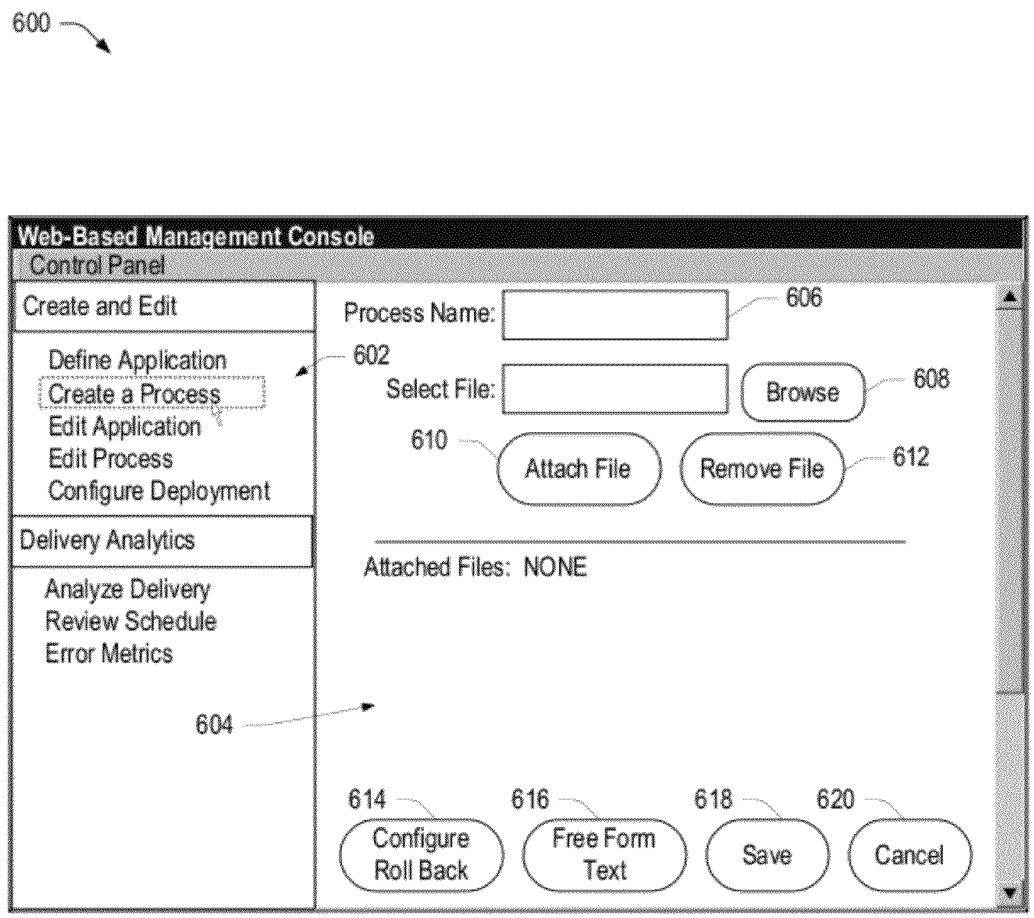
FIG. 6 is a diagram of an illustrative example of a user interface accessible by an operator to configure the management server of FIG. 1.

FIG. 6 is a diagram of an illustrative example of a user interface 600 accessible by an operator to configure the management server 102 of FIG. 1. User interface 600 includes a control panel 602 including a plurality of options accessible by a user to "Create and Edit" process requests. The plurality of options includes options to define a capability library related to an application, create a new capability library, edit an existing capability library related to an application, edit an existing capability library associated with an application, and configure deployment for a particular process. For example, a staged rollout of an upgrade/new capability installation may be scheduled using the configure deployment option. Control panel 602 further includes a second plurality of options accessible by a user to access "Delivery Analytics," providing the user the opportunity to analyze delivery metrics, review scheduled rollouts, review error metrics, etc.

User interface 600 further includes an input panel 604 having a text input 606 that allows a user to enter a name for a new process and/or to select a "browse" button 608 to locate and select a file stored in memory. Once selected, the user may select the "Attach File" button 610 to attach the selected file or the "Remove File" button 612 to remove an attached file. Input panel 604 may include other user-selectable options, such as pull-down menus, check boxes, radio buttons, and the like. In this example, input panel 604 also includes a "Configure Roll Back" button 614, a "Free Form Text" button 616, a "Save" button 618, and a "Cancel" button 620. By selecting "Configure Roll Back" button 614, a user accesses existing deployments to select from a previous deployment for scheduling a "un-install" operation optionally with re-installation of an application or service that was previously overwritten or removed. Selection of "Free Form Text" button 616 provides access to a text window within which a user may type or paste previously typed instructions for creating a new process or for editing an existing set of instructions. Selection of the "Configure Roll Back" button 614 and/or the "Free Form Text" button 616 may lead to different user options, depending on the context from which the button is selected. For example, selection of the "Define Application" option from the control pane may produce an input panel similar to input panel 604; however, selection of "Free Form Text" button may lead to different available options than when the same button is selected in the context of editing an existing process.

Input panel 604 further includes a "Save" button 618 and a "Cancel" button 620, which are accessible by a user to save or cancel user inputs. In this instance, clicking the "Save" button 618 would save whatever process name was created and/or any file that was uploaded and attached.

It should be appreciated that user interface 600 is just one possible interface through which a user, such as an administrator, can schedule application/service upgrades from a management server 102, which can then be pushed to one or more other devices, such as server 106, for processing using bridge application 136. Other user interfaces rendered within an Internet browser application or interfaces implemented by stand-alone applications may also be provided.

In conjunction with the systems and methods described above with respect to FIGS. 1-6, a bridge application is disclosed that is configured to facilitate installation of new or upgraded applications or services and/or to facilitate roll back and re-installation of applications or services. The bridge application is installed at a computing system with a local data store, and the bridge application is configured to communicate with a management server application to receive capability library components that can be used to install new applications or services, to upgrade existing applications or services, and/or to roll back and installation and re-install the service or application. Bridge application processes installation requests by searching a local data store to locate a capability library component associated with at least a portion of an installation request. If one is located, bridge application communicates a version of the component to the management server application to verify that the version is a newest version suitable for processing the request. If it is, bridge application uses the capability library component to process the portion of the request. If it is not, management server application transmits a newer version of the capability library request to the bridge application, which stores it locally and uses it to process the portion of the request.

Although the present invention has been described with reference to preferred embodiments, workers skilled in the art will recognize that changes may be made in form and detail without departing from the scope of the invention.

What is claimed is:

1. A non-transitory computer-readable medium comprising instructions that, when executed by a processor, cause the processor to:
   execute a bridge application, the bridge application being configured to:
      receive an installation request from a remote device through a communication channel to update a software component associated with the processor;
      identify a capability library component that will be used to perform at least a portion of the installation request to update the software component, wherein the capability library component is a separate component from the software component and is a separate component from the installation request and the capability library component includes processor-executable code and is non-independently executable as a separate application;
      retrieve and execute the capability library component from a local data store to perform the portion of the installation request and execute the bridge application, the bridge application being further configured to send an acknowledgment to the remote device, the acknowledgment indicating a version of the capability library component retrieved from the local data store if the local data store includes the capability library component; and
      request the capability library component from the remote device if the local data store does not include the capability library component.

2. The computer-readable medium of claim 1, wherein, if the local data store does not include the capability library component, the computer-readable medium further comprises instructions that, when executed by the processor, cause the processor to:
   execute the bridge application, the bridge application being further configured to:
      receive the capability library component from the remote device;
      store the capability library component in the local data store; and
      retrieve and execute the capability library component from the local data store to perform the portion of the installation request.

3. The computer-readable medium of claim 1, wherein the installation request comprises one or more instructions to perform at least one of an installation operation, an upgrade operation, a modification operation, and a removal operation associated with one of an application, a service, or a configuration.

4. The computer-readable medium of claim 1, wherein the installation request comprises a request to roll back installation from a current state to a prior state.

5. The computer-readable medium of claim 1, further comprising instructions that, when executed by the processor, cause the processor to: execute the bridge application, the bridge application being further configured to: wait for a response from the remote device; and process the installation request based on the response.

6. The computer-readable medium of claim 5, wherein the response comprises a newer version of the capability library component.

7. The computer-readable medium of claim 6, further comprising instructions that, when executed by the processor, cause the processor to:
   execute the bridge application, the bridge application being further configured to:
      install the newer version of the capability library component in the local data store;
      load the newer version of the capability library component; and
      process the installation request using the newer version of the capability library component.

8. A method comprising:
   receiving an installation request at a bridge application running on a computing system from a remote device through a communication channel, wherein the installation request is related to a software component;
   automatically identifying, by the bridge application, a capability library component that will be used to perform at least a portion of the installation request related to the software component, wherein the capability library component is a separate component from the software component associated with the installation request and is a separate component from the installation request and the capability library component includes processor-executable code and is non-independently executable as a separate application;
   sending data, by the bridge application, indicating an acknowledgment to the remote device, the acknowledgment indicating a version of the capability library component retrieved from the local data store if the capability library component is in a local data store;
   receiving, by the bridge application, a signal from the remote device; and
   selectively processing the installation request by the bridge application in response to the signal.

9. The method of claim 8, wherein the signal comprises a newer version of the capability library component.

10. The method of claim 9, wherein selectively processing the installation request by the bridge application further comprises:
   extracting the newer version of the capability library component from the signal;
   storing the newer version of the capability library component in the local data store; and
   processing the installation request using the newer version in response to receiving the signal.

11. The method of claim 8, wherein, if the local data store does not include the capability library component, the method further comprises:
   requesting, by the bridge application, the capability library component from the remote device;
   receiving, by the bridge application, the capability library component from the remote device through the communication channel in response to requesting the capability library component; and
   processing the installation request by the bridge application using the capability library component in response to receiving the capability library component.

12. The method of claim 8, wherein receiving the installation request comprises an instructions to install at least one of a new service, a new application, and an update to provide a new capability.

13. The method of claim 8, further comprising:
   receiving, by the bridge application, a second request from the remote device;
   identifying, by the bridge application, a second capability library component to perform at least a portion of the second request;
   retrieving, by the bridge application, the second capability library component from the local data store if the local data store includes the second capability library component;
   requesting, by the bridge application, the second capability library component from the remote device if the local data store does not include the capability library component; and
   processing the second request by the bridge application using the second capability library component to remove a previous installation and to restore the computing system to a previous state.

14. An apparatus comprising:
   an interface adapted to couple to a network;
   a processing system coupled to the interface; and
   a memory coupled to the processing system, wherein the memory stores a plurality of capability library components and at least one of an application and a set of instructions for providing a service, wherein the application comprises a bridge application, the memory embodying instructions that, when executed by the processing system, cause the processing system to execute the bridge application to:
      receive an installation request to install at least one of a second application from a remote device via the interface, a second set of instructions, an updated version of the second application, and an updated version of the second set of instructions;
      determine a capability library component for processing the installation request, wherein the capability library component is a separate component from the second application and the second set of instructions and is a separate component from the installation request and the capability library component includes processor-executable code and is non-independently executable as a separate application;
      retrieve the capability library component from one of the remote device and the plurality of capability library components;
      if a local data store includes the capability library component the bridge application being further configured to send an acknowledgment to the remote device, the acknowledgment indicating a version of the capability library component retrieved from the local data store; and
      process the installation request using the capability library component.

15. The apparatus of claim 14, wherein the instructions that, when executed, cause the processing system to retrieve the capability library component, comprise instructions that cause the processing system to execute the bridge application to:
   search the plurality of capability library components to identify the capability library component for processing the installation request; and load and execute the capability library component to process the installation request when the capability library component is within the plurality of capability library components.

16. The apparatus of claim 15, wherein the instructions that, when executed, cause the processing system to retrieve the capability library component, further comprise instructions that cause the processing system to execute the bridge application to:
   request the capability library component from the remote device if the capability library component is not within the plurality of capability library components;
   receive the capability library component from the remote device; and
   store the capability library component in the plurality of capability library components.

17. The apparatus of claim 16, wherein the instructions that, when executed, cause the processing system to retrieve the capability library component further comprise instructions that cause the processing system to execute the bridge application to:
   load the capability library component; and
   process the installation request using the capability library component.

18. The apparatus of claim 14, wherein the instructions that, when executed, cause the processing system to retrieve the capability library component, comprise instructions that cause the processing system to execute the bridge application to:
   receive a second request to remove a previous installation to restore the processing system to previous known state;
   determine a second capability library component for processing the second request;
   retrieve the second capability library component from one of the remote device and the plurality of capability library components; and
   process the second request using the second capability library component to remove the previous installation.

19. The apparatus of claim 14, wherein the instructions that, when executed, cause the processing system to receive the installation request cause the processing system to execute the bridge application to receive the installation request through a secure communication channel.

* * * * *